United States Patent
Singh et al.

(10) Patent No.: US 11,507,710 B2
(45) Date of Patent: Nov. 22, 2022

(54) SYSTEM AND METHOD FOR OPTIMIZATION OF INDUSTRIAL PROCESSES

(71) Applicant: Tata Consultancy Services Limited, Mumbai (IN)

(72) Inventors: Prateek Singh, Pune (IN); Dilshad Ahmad, Pune (IN); Saurabh Mangal, Pune (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 54 days.

(21) Appl. No.: 17/178,042

(22) Filed: Feb. 17, 2021

(65) Prior Publication Data
US 2021/0303742 A1    Sep. 30, 2021

(30) Foreign Application Priority Data
Mar. 26, 2020 (IN) .............. 202021013243

(51) Int. Cl.
*G06F 30/10* (2020.01)
*G06F 30/27* (2020.01)
(Continued)

(52) U.S. Cl.
CPC ........... *G06F 30/10* (2020.01); *G05B 13/042* (2013.01); *G06F 30/27* (2020.01); *G06N 3/126* (2013.01); *G06F 2111/10* (2020.01)

(58) Field of Classification Search
CPC ...... G06F 30/10; G06F 30/27; G06F 2111/10; G06F 30/28; G06F 30/00; G06F 30/20; G05B 13/042; G05B 17/02; G06N 3/126
See application file for complete search history.

(56) References Cited

U.S. PATENT DOCUMENTS

| | | | |
|---|---|---|---|
| 2007/0100475 A1 | 5/2007 | Korchinski | |
| 2010/0004769 A1* | 1/2010 | Holden | .................. G06F 30/17 703/1 |

(Continued)

OTHER PUBLICATIONS

Van der Herten et al. "Adaptive classification under computational budget constraints using sequential data gathering" 2016, Advances in Engineering Software 99 (2016) 137-146 (Year: 2016).*

(Continued)

*Primary Examiner* — Rehana Perveen
*Assistant Examiner* — Troy A Maust
(74) *Attorney, Agent, or Firm* — Finnegan, Henderson, Farabow, Garrett & Dunner, LLP

(57) ABSTRACT

This disclosure relates generally to system and method for optimization of industrial processes, for example a tundish process. Typically geometries for industrial processes are simulated in a numerical analysis model such as a CFD. In order to simulate a physical phenomenon (such as tundish process) numerically, the domain thereof is discretized in order to convert the differential equations to be solved in the domain into linear equations. The accuracy of a CFD solution is dependent on a mesh of the domain, which in turn depends on a geometry thereof. For setting up an optimization task, the disclosed method provides first a CFD friendly base geometry, so that a faulty geometry can be detected before forming the complete geometry.

11 Claims, 5 Drawing Sheets

(51) Int. Cl.
*G05B 13/04* (2006.01)
*G06N 3/12* (2006.01)
*G06F 111/10* (2020.01)

(56) References Cited

U.S. PATENT DOCUMENTS

| | | | |
|---|---|---|---|
| 2014/0365180 A1* | 12/2014 | Lam | G06F 30/13 703/1 |
| 2019/0332730 A1 | 10/2019 | Ahmad et al. | |
| 2021/0102722 A1* | 4/2021 | Nabi | F24F 11/50 |
| 2021/0271793 A1* | 9/2021 | Pivovar | G21C 5/02 |

OTHER PUBLICATIONS

Stephens, Darrin et al., "Optimisation of Process Equipment Using Global Surrogate Models", International Conference on CFD in the Minerals and Process Industries, Dec. 2012, Research Gate, https://www.researchgate.net/publication/266138725_OPTIMISATION_OF_PROCESS_EQUIPMENT_USING_GLOBAL_SURROGATE_MODELS/link/5426052c0cf238c6ea7785c5/download.

Kim, Sung et al., "Design Optimization of Centrifugal Pump Impellers in a Fixed Meridional Geometry using DOE", International Journal of Fluid Machinery and Systems, Jun. 2009, Research Gate, https://www.researchgate.net/publication/263361217_Design_Optimization_of_Centrifugal_Pump_Impellers_in_a_Fixed_Meridional_Geometry_using_DOE/link/543c69a80cf24ef33b7626d4/download.

Pfrommera, Julius et al., "Optimisation of manufacturing process parametersusing deep neural networks as surrogate models", Procedia CIRP, Mar. 2018, Research Gate, https://www.researchgate.net/publication/323607624_Optimisation_of_manufacturing_process_parameters_using_deep_neural_networks_as_surrogate_models/link/5a9fce27a6fdcc22e2cbeb21/download.

Han, Zhong-Hua et al., "Surrogate-Based Optimization", Real-World Applications of Genetic Algorithms, Mar. 2012, Research Gate, https://www.researchgate.net/publication/221927230_Surrogate-Based_Optimization/link/57284dde08ae586b21e2a232/download.

Arcos, Julián Ignacio López et al., "Improve the product design process, with CFD and DOE approach", International Conference on Industrial Engineering and Operations Management, Oct. 2017, Research Gate, https://www.researchgate.net/publication/322508656_Improve_the_product_design_process_with_CFD_and_DOE_approach/link/5a5cf4edaca272d4a3dd8912/download.

Devi, Sujata et al., "Flow Optimization in the Tundish With the Different Combination of Flow Modifiers", Research & Development, Sep. 2011, Research Gate, https://www.researchgate.net/publication/274362763_FLOW_OPTIMIZATION_IN_THE_TUNDISH_WITH_THE_DIFFERENT_COMBINATION_OF_FLOW_MODIFIERS/link/551bde8a0cf20d5fbde21b93/download.

Bul'ko, Branislav et al., "Geometric Modification of the Tundish Impact Point", Metals—Open Access Metallurgy Journal, Nov. 2018, MDPI, https://www.researchgate.net/publication/328946971_Geometric_Modification_of_the_Tundish_Impact_Point/fulltext/5beceea14585150b2bb73cdd/Geometric-Modification-of-the-Tundish-Impact-Point.pdf?origin=publication_detail.

Ferraz, Rodrigo, "A strategy for optimization problems involving complex CFD simulations", Resource Center, 2018, Esteco, https://www.esteco.com/cmis/browser?id=workspace://SpacesStore/75dda724-f160-4adb-8d02-2e58576ce65a.

\* cited by examiner

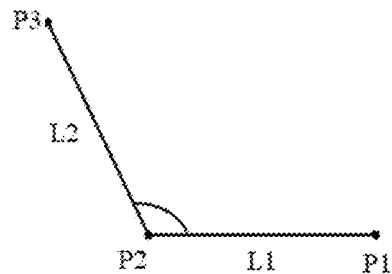
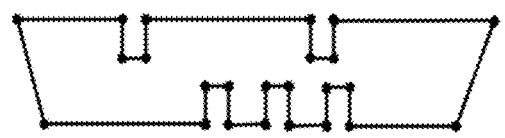
FIG. 1A    FIG. 1B
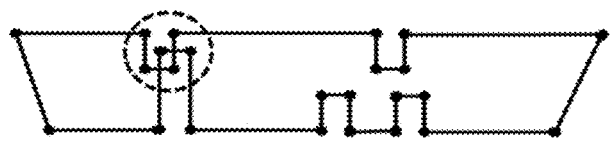
FIG. 1C
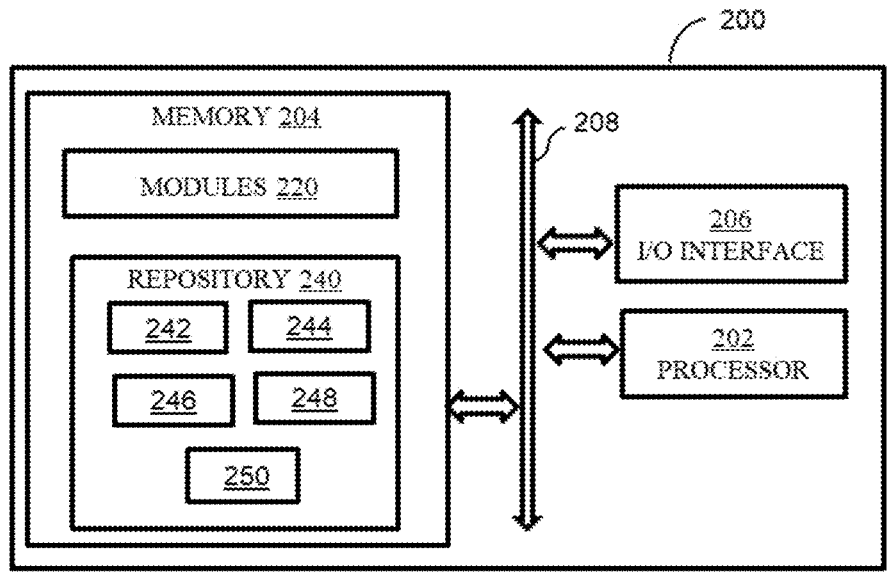
FIG. 2

SYSTEM AND METHOD FOR OPTIMIZATION OF INDUSTRIAL PROCESSES

PRIORITY CLAIM

This U.S. patent application claims priority under 35 U.S.C. § 119 to: India Application No. 202021013243, filed on Mar. 26, 2020. The entire contents of the aforementioned application are incorporated herein by reference.

TECHNICAL FIELD

The disclosure herein generally relates to optimization of industrial processes, and, more particularly, to and method and system for optimization of geometry and operational parameters of an equipment in industrial processes using numerical techniques.

BACKGROUND

Industrial processes include various processes including but not limited chemical, physical, electrical or mechanical to aid in manufacturing. One such process is Tundish process/operation which is an important step in steelmaking process. Tundish serves as a buffer and links batch process of secondary steelmaking with the continuous casting process. Tundish process plays a major role in smoothing out flow, regulating metal feed to the molds, and maintaining chemical and thermal homogeneity. It also facilitates steel cleanliness by promoting entrapment of less dense inclusions like gas bubbles, slag or oxides, or undissolved alloys into the slag layer above the molten steel. The floatation of aforementioned inclusions in Tundish process is promoted by incorporating different flow control arrangements such as dams and weirs. In addition, these flow modifiers also help in reducing the dead and short circuit volumes within Tundish which is essential for proper mixing of molten steel.

SUMMARY

Embodiments of the present disclosure present technological improvements as solutions to one or more of the above-mentioned technical problems recognized by the inventors in conventional systems. For example, in one embodiment, a method for optimization of industrial processes is provided. The method includes receiving a plurality of model parameters associated with an industrial process, via one or more hardware processors. The plurality of model parameters comprises a plurality of geometrical parameters and a plurality of operational parameters of an equipment and an optimization function associated with an optimization of the industrial process. Further, the method includes generating, via the one or more hardware processors, first objective function data for an objective function associated with the optimization task by using one or more model parameters from amongst the plurality of model parameters, wherein generating the first objective function data comprises iteratively and selectively varying the plurality of model parameters to obtain a data set of the model parameters, checking a plurality of geometrical parameters associated with the data set based on a set of rules to identify a set of geometrical parameters capable of facilitating creation of valid geometries for the numerical analysis model, and performing simulations using at least the set of geometrical parameters as model parameters on a numerical analysis model to generate the first objective function data. Furthermore, the method includes identifying, via the one or more hardware processors, a set of significant variables from amongst the plurality of model parameters by analyzing relative variation in the first objective function data with respect to model parameters. Also, the method includes creating, via the one or more hardware processors, a Design of Experiments (DOE) table comprising model parameters and variations of model parameters based on the set of significant variables by using the DOE table creation model. Moreover, the method includes generating, via the one or more hardware processors, a second objective function data using the DOE table. Also, the method includes creating, via the one or more hardware processors, a surrogate model capable of predicting objective function data corresponding to the significant parameters using the second objective function data and a surrogate modelling technique. Also, the method includes optimizing, via the one or more hardware processors, the industrial process using the surrogate model and an optimization model.

In another aspect, a system for optimization of industrial processes is provided. The system includes one or more memories; and one or more hardware processors, the one or more memories coupled to the one or more hardware processors, wherein the one or more hardware processors are configured to execute programmed instructions stored in the one or more memories, to receive a plurality of model parameters associated with an industrial process, the plurality of model parameters comprising a plurality of geometrical parameters and a plurality of operational parameters of an equipment and an optimization function associated with an optimization of the industrial process. Further, the one or more hardware processors are configured by the instructions to generate first objective function data for an objective function associated with the optimization task by using one or more model parameters from amongst the plurality of model parameters. Further, to generate the first objective function data, the one or more hardware processors are configured by the instructions to iteratively and selectively vary the plurality of model parameters to obtain a data set of the model parameters, check a plurality of geometrical parameters associated with the data set based on a set of rules to identify a set of geometrical parameters capable of facilitating creation of valid geometries for the numerical analysis model, and perform simulations using at least the set of geometrical parameters as model parameters on a numerical analysis model to generate the first objective function data. Furthermore, the one or more hardware processors are configured by the instructions to identify a set of significant variables from amongst the plurality of model parameters by analyzing relative variation in the first objective function data with respect to model parameters. Moreover, the one or more hardware processors are configured by the instructions to create a Design of Experiments (DOE) table comprising model parameters and variations of model parameters based on the set of significant variables by using a DOE table creation model. Also, the one or more hardware processors are configured by the instructions to generate a second objective function data using the DOE table. Also, the one or more hardware processors are configured by the instructions to create a surrogate model capable of predicting objective function data corresponding to the significant parameters using the second objective function data and a surrogate modelling technique. Also, the one or more hardware processors are configured by the instructions to optimize the industrial process using the surrogate model and an optimization model.

In yet another aspect, a non-transitory computer readable medium for a method for optimization of industrial processes is provided. The method includes receiving a plurality of model parameters associated with an industrial process, via one or more hardware processors. The plurality of model parameters comprises a plurality of geometrical parameters and a plurality of operational parameters of an equipment and an optimization function associated with an optimization of the industrial process. Further, the method includes generating, via the one or more hardware processors, first objective function data for an objective function associated with the optimization task by using one or more model parameters from amongst the plurality of model parameters, wherein generating the first objective function data comprises iteratively and selectively varying the plurality of model parameters to obtain a data set of the model parameters, checking a plurality of geometrical parameters associated with the data set based on a set of rules to identify a set of geometrical parameters capable of facilitating creation of valid geometries for the numerical analysis model, and performing simulations using at least the set of geometrical parameters as model parameters on a numerical analysis model to generate the first objective function data. Furthermore, the method includes identifying, via the one or more hardware processors, a set of significant variables from amongst the plurality of model parameters by analyzing relative variation in the first objective function data with respect to model parameters. Also, the method includes creating, via the one or more hardware processors, a Design of Experiments (DOE) table comprising model parameters and variations of model parameters based on the set of significant variables by using a DOE table creation model. Moreover, the method includes generating, via the one or more hardware processors, a second objective function data using the DOE table. Also, the method includes creating, via the one or more hardware processors, a surrogate model capable of predicting objective function data corresponding to the significant parameters using the second objective function data and a surrogate modelling technique. Also, the method includes optimizing, via the one or more hardware processors, the industrial process using the surrogate model and an optimization model.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIGS. 1A-1C illustrate an example of illegal interactions obtained in a geometry created for computational fluid dynamics (CFD) in accordance with an example embodiment of the present disclosure.

FIG. 2 illustrates a block diagram of a system for optimization of industrial processes, in accordance with an example embodiment of the present disclosure.

DETAILED DESCRIPTION

Figure 3A:
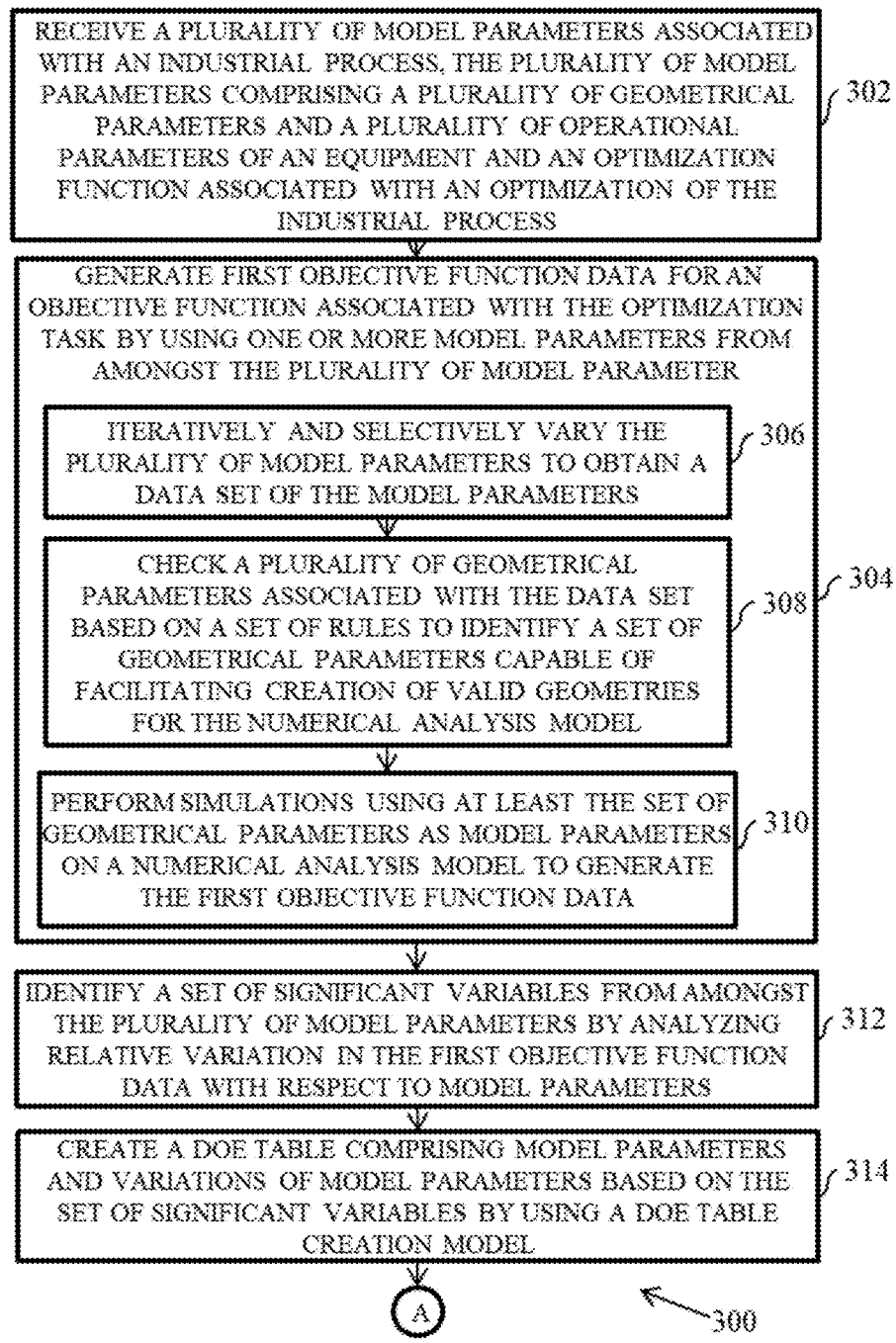
FIGS. 3A-3B is a flow diagram for optimization of industrial processes in accordance with some embodiments of the present disclosure.

Tundish process is used for continuous casting of steel. During the process of steel casting, molten steel is transferred from a steel teeming ladle to a mould. The mould is an intermediate vessel called a Tundish. The Tundish acts as a reservoir of molten steel and feeds said steel to a continuous casting machine during change of steel ladles. The Tundish is required to optimally deliver liquid steel to moulds evenly and at a designed throughput rate and temperature without causing contamination by inclusions.

Conventionally, optimization of the Tundish process may be accomplished by performing experiments and simulations and optimizing the Tundish process parameters to obtain the desired results. However, due to the absence of any detailed generalized automated method, obtaining an optimized solution in a time efficient manner is challenging.

The problems of fluid flow can be solved using Computational fluid dynamics (CFD). CFD is a branch of fluid mechanics that uses numerical analysis and data structures to analyze and solve problems that involve fluid flows. In order to simulate a physical phenomenon (such as tundish process) numerically, the domain is discretized in order to convert the differential equations to be solved in the domain into linear equations. The accuracy of a CFD solution is highly dependent on the mesh of the domain, which in turn depends on its geometry. A faulty geometry not only increases the time of creation thereof, but also the time for creating the mesh, and performing simulation for the respective geometry. It is therefore highly important to create a CFD friendly geometry for better accuracy of results and to save time and computational resources.

Conventional systems typically perform geometry optimization using CFD to predict the optimal geometry based on the respective objective function(s) and model geometric parameters. In such conventional systems, first a base geometry is created which is CFD friendly. In order to create the geometry, first the points required to define the geometry are obtained, these points are connected through lines/curves to form different surfaces which in turn are connected to form the geometry. While creating the base geometry for an optimization task, the consistent connections between different points are defined to create a CFD friendly geometry. Thereafter, different combinations of geometric parameters are obtained from a Design of Experiments (DOE) table, and accordingly different geometries are created. While these geometric parameters are varied there is a great chance of obtaining illegal interactions between the lines and/or curves joining the points. An example of obtaining illegal interactions is described further with reference to FIGS. 1A-1C.

Referring now to FIGS. 1A-1C, an example of illegal interactions obtained in a geometry created for CFD is illustrated in accordance with an example embodiment. For example, FIG. 1A illustrates two intersecting line segments L1 and L2 which are formed by points P1, P2 and P3. In a typical geometry optimization study the lengths of line segments L1 and L2 along with the angle between them may be varied to obtain different combinations. A geometry may have many of such line segments (FIG. 1B) and numerous combinations of their lengths, angles, etc. may be taken to form various geometries. Thus, the possibility of obtaining a faulty/illegal geometry increases with the number of geometric parameters of the study. An example of an illegal interaction is shown by a dotted circle in FIG. 1C.

In optimization tasks using DOE, checking geometry before passing it for meshing, is crucial due to a large number of geometries that can be created. For example, if there are m factors or the variables associated with the optimization task, and n levels (i.e. number of possible different values of the variable) of factors, then nm geometries may be generated. For setting up an optimization task, first a CFD friendly base geometry is obtained, so a faulty geometry (provided by the DOE table) can be detected before forming the complete geometry at the surface level itself.

Various embodiments disclosed herein provides method and system for optimization of industrial processes by detecting the inconsistencies while forming a surface of the geometry. Herein it should be noted that said detection at the surface level can save a considerable amount of time and computing resources, as complex geometries may take a longer time for creation thereof and the conventionally available systems for geometry check operates only on a completely created geometry. Since a faulty region of a geometry takes more time to get meshed because of the increase in the iterations required to obtain a CFD usable mesh, it is pertinent to perform such checks to avoid further wastage of time and computational resources in the creation of mesh. Furthermore, the simulations over such mesh may take longer time to get converged or they may not even get converged. Beside the waste of time and resources, if a solution is obtained on such mesh, it may result into introduction of error in the formulated surrogate model and thus optimization. Accordingly, in order to obtain an accurate optimized solution along in a time-efficient and resource efficient manner, a geometry check needs to be performed for design optimization studies using CFD.

Various embodiments disclosed herein provides method and system for optimization of industrial processes, and in particular, the Tundish process associated with steelmaking. For example, in one embodiment, the method for optimization of Tundish process includes receiving user selection of input variables from amongst the available geometrical and operational parameters of an equipment and an objective function for which optimization has to be made. Numerical runs/experiments are performed by varying one of the selected variables (geometrical and operational parameters) at a time, while keeping rest of the variables constant to obtain the objective function data. An important contribution of the disclosed embodiments is checking of a plurality of geometrical parameters associated with the data set based on a set of rules to identify a set of geometrical parameters that are capable of facilitating creation of valid geometries for the numerical analysis model. Such geometrical parameters capable of providing valid geometries are then used to perform the sensitivity analysis to identify the significant variables out the selected input variables. Design of Experiments (DOE) table is then formulated for the significant variables and objective function data is obtained for every experiment (Tundish geometry) of DOE table using simulations. Thereafter, a number of surrogate modelling techniques are used to formulate surrogate models and the model with best prediction accuracy is selected. Based on the surrogate modelling method, an optimization technique is selected to optimize the objective function to get the optimal parameters.

The method(s) and system(s) for optimization of geometrical and process parameters of an equipment are further described in conjunction with the following figures. It should be noted that the description and figures merely illustrate the principles of the present subject matter. It will thus be appreciated that those skilled in the art will be able to devise various arrangements that, although not explicitly described or shown herein, embody the principles of the present subject matter and are included within its spirit and scope. Furthermore, all examples recited herein are principally intended expressly to be only for pedagogical purposes to aid the reader in understanding the principles of the present subject matter and the concepts contributed by the inventor(s) to furthering the art, and are to be construed as being without limitation to such specifically recited examples and conditions. Moreover, all statements herein reciting principles, aspects, and embodiments of the present subject matter, as well as specific examples thereof, are intended to encompass equivalents thereof.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Referring now to the drawings, and more particularly to FIGS. 2 through 6, where similar reference characters denote corresponding features consistently throughout the figures, there are shown preferred embodiments and these embodiments are described in the context of the following exemplary system and/or method.

FIG. 2 illustrates a block diagram of a system 200 for optimization of industrial processes, in accordance with an example embodiment. In an embodiment, the system 200 facilitates in determining an optimal solution for optimization of Tundish process used for steelmaking. In an embodiment, the disclosed system is capable of detecting the inconsistencies while forming a surface of the geometry during CFD modeling associated with the Tundish process optimization.

The system 200 includes or is otherwise in communication with one or more hardware processors such as a processor 202, at least one memory such as a memory 204, and an I/O interface 206. The processor 202, memory 204, and the I/O interface 206 may be coupled by a system bus such as a system bus 208 or a similar mechanism. The I/O interface 206 may include a variety of software and hardware interfaces, for example, a web interface, a graphical user interface, and the like The interfaces 206 may include a variety of software and hardware interfaces, for example, interfaces for peripheral device(s), such as a keyboard, a mouse, an external memory, a camera device, and a printer. Further, the interfaces 206 may enable the system 200 to communicate with other devices, such as web servers and external databases. The interfaces 206 can facilitate multiple communications within a wide variety of networks and protocol types, including wired networks, for example, local area network (LAN), cable, etc., and wireless networks, such as Wireless LAN (WLAN), cellular, or satellite. For the purpose, the interfaces 206 may include one or more ports for connecting a number of computing systems with one another or to another server computer. The I/O interface 206 may include one or more ports for connecting a number of devices to one another or to another server.

The hardware processor 202 may be implemented as one or more microprocessors, microcomputers, microcontrollers, digital signal processors, central processing units, state machines, logic circuitries, and/or any devices that manipulate signals based on operational instructions.

Among other capabilities, the hardware processor 202 is configured to fetch and execute computer-readable instructions stored in the memory 204.

The memory 204 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory 204 includes a plurality of modules 220 and a repository 240 for storing data processed, received, and generated by one or more of the modules 220. The modules 220 may include routines, programs, objects, components, data structures, and so on, which perform particular tasks or implement particular abstract data types.

The repository 240, amongst other things, includes a system database 242 and other data 244. The other data 244 may include data generated as a result of the execution of one or more modules in the other modules 230. The repository 240 is further configured to maintain a plurality of model parameters 246, a first objective function data 248 and a second objective function data 250 associated with the optimization task. The plurality of model parameters 246, the first objective function data 248 and the second objective function data 250 are described further in detail in the description below.

According to the present subject matter, the system 200 performs optimization of industrial processes. In an embodiment, the system 200 optimizes geometrical and process parameters of any industrial equipment or the process, for example those associated with the tundish process. The process of optimization is described further with reference to FIGS. 3A-6.

Figure 3B:
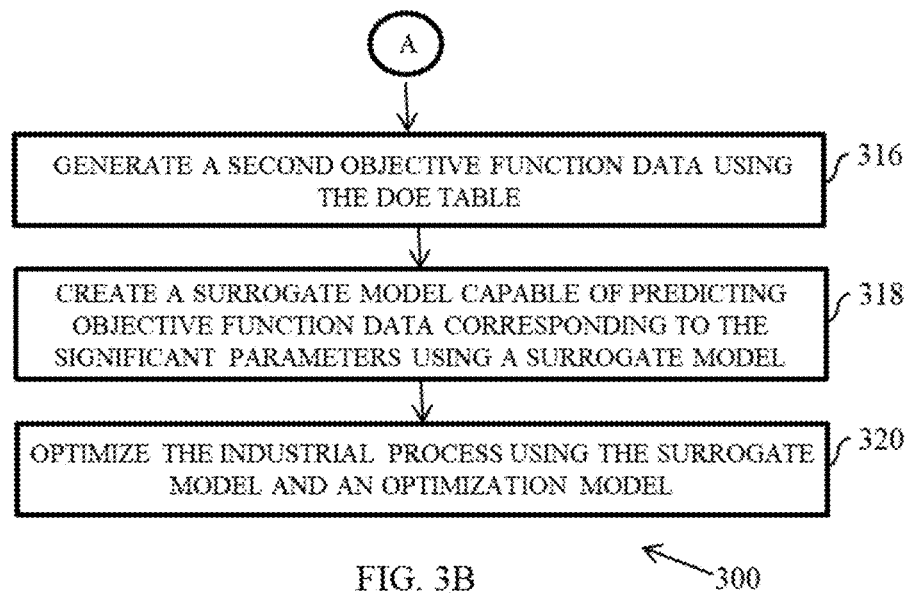

Referring to FIGS. 3A-3B, a flow diagram of a method for optimization of industrial processes is described in accordance with an example embodiment. The method 300 depicted in the flow chart may be executed by a system, for example, the system, 100 of FIG. 1. In an example embodiment, the system 100 may be embodied in a computing device.

Operations of the flowchart, and combinations of operation in the flowchart, may be implemented by various means, such as hardware, firmware, processor, circuitry and/or other device associated with execution of software including one or more computer program instructions. For example, one or more of the procedures described in various embodiments may be embodied by computer program instructions. In an example embodiment, the computer program instructions, which embody the procedures, described in various embodiments may be stored by at least one memory device of a system and executed by at least one processor in the system. Any such computer program instructions may be loaded onto a computer or other programmable system (for example, hardware) to produce a machine, such that the resulting computer or other programmable system embody means for implementing the operations specified in the flowchart. It will be noted herein that the operations of the method 300 are described with help of system 100. However, the operations of the method 300 can be described and/or practiced by using any other system.

At 302, the method 300 includes receiving a plurality of model parameters associated with the industrial process. In an embodiment, the plurality of model parameters includes a plurality of geometrical parameters and a plurality of operational parameters of an equipment and an optimization function associated with an optimization of the industrial process. In an embodiment, the plurality of model parameters may be received from a user who is performing the optimization task or direct or indirectly related to performance of the optimization task. The user may be a subject matter expert. The plurality of model parameters includes those parameters for which the optimization is to be performed. In an embodiment, the plurality of model parameters may be input to the system 100 and the system 100 carries out the optimization process.

In an embodiment, the geometrical parameters may include one or more of the geometrical dimensions and shape of the equipment. The operational parameters may include physical parameters of the process happening in the equipment such as material flow rate, material properties and ambient conditions. The objective function is the quantity that needs to be optimized using optimization process by varying input parameters.

At 304, the method 300 includes generating first objective function data for the objective function associated with the optimization task by using one or more model parameters from amongst the plurality of model parameters. The method for generating the first objective function data is explained further with reference to steps 306-310. At 306, the method 304 includes iteratively and selectively varying the plurality of model parameters to obtain a data set of the model parameters. In an embodiment, the model parameters are varied and passed for creation of the first objective function data. The variation of the plurality of the model parameters may be performed by varying one parameter at a time. Alternatively, said variation may be performed by using a design of experiment (DOE) technique. The data set generated upon variation gives the first objective function data which is subsequently used for identification of significant model parameters, as will be described further in description.

At 308, the method 304 includes checking a plurality of geometrical parameters associated with the data set based on a set of rules to identify a set of geometrical parameters capable of facilitating creation of valid geometries for the numerical analysis model. In an embodiment, the set of rules may include a rule associated with non-intersecting lines and surfaces associated with the geometry of the equipment. Additionally or alternatively, a rule from amongst the set of rules may include a rule associated with formation of closed geometry of the equipment.

At 310, the method 304 includes performing simulations using at least the set of geometrical parameters as model parameters on a numerical analysis model to generate the first objective function data. In an embodiment, the numerical analysis model may be a CFD model. The numerical analysis model may include parameters such as geometry, mesh, physics, simulation ready input, simulation tool and simulation results. The geometry is the geometry of any equipment used industrial process. This geometry is intended to be optimized using optimization process in optimization method 300. Before starting optimization process, selection of model parameters is done on key geometrical parameters including but not limited to inlet dimension, length, width, and so on. The geometry is then taken for creation of mesh which converts entire geometry into number of three-dimension grids. Said geometry in the form of mesh is then used for creation of simulation ready input by applying suitable physics onto it. The simulation ready input is used to generate simulation results by using suitable CFD simulation tool. The simulation results are utilized to obtain the first objective function data by carrying out post processing on it.

At 312, the method includes identifying a set of significant variables from amongst the plurality of model parameters by analyzing relative variation in the first objective function data with respect to model parameters. The identification of significant variables may be done by analyzing relative variation in the first objective function data with respect to the model parameters. The significant parameters are further used in creation of DOE table. In an embodiment, if the variation in the first objective function data due to the variation of respective model parameter is not significant, then the model parameter may be removed from the plurality of model parameters that may be considered for the optimization task. At 314, the method 300 includes creating a DOE table comprising model parameters and variations of model parameters based on the set of significant variables by using a DOE table creation model. The creation of DOE table may be done with one of the techniques Latin Hypercube, Full Factorial, Taguchi etc. At this stage the model parameters and variations thereof are available in the form of DOE table. Variables from the DOE table are used in forming different geometries, their meshing and performing CFD simulations in order to obtain the objective function to create a second objective function data. At 316, the method 300 includes generating the second objective function data using the DOE table.

At 318, the method 300 includes creating a surrogate model capable of predicting objective function data corresponding to the significant parameters using a surrogate model. The surrogate model creation may be done using a surrogate modeling technique including, but not limited to one of the linear, polynomial, kNN, Random Forest etc.

In an embodiment, utilizing second objective function data obtained from DOE table, the surrogate model is formulated with output variable(s) thereof as the second objective function data, and input variables thereof as the significant model parameters. Surrogate models are used to predict the second objective function data with respect to the given input of model parameters without running the CFD simulations. Said surrogate model may be used to predict the second objective function data for any values of significant parameters. This surrogate model may be further used to achieve optimum parameters through optimization. The creation of surrogate model includes data verification that is done on the second objective function data to check for any inconsistencies. If any inconsistencies are found, they are either resolved with methods of the state of the art of data analytics or the points are removed. Thereafter, data transformation is performed using techniques such as bucketing, normalization, one hot encoding, various mathematical transformation, and so on. The aforementioned techniques namely, data verification and data transformation may be once (for the first time) set by the user for the process in the equipment In an embodiment, the surrogate model may be formulated by identifying a selection criteria for judging the prediction accuracy of the model. Said selection criteria may be, for example, R-square, % mean error, and so on. Thereafter, all the concerned surrogate modeling techniques may be tested including, for example, linear, two degree, three degree, k-Nearest Neighbor (kNN), Support Vector Machine (SVM), Random Forest, and so on. The model with the best prediction accuracy may be selected as the surrogate model for the objective function. In another embodiment, a tolerance value of selection criteria such as R-square, and so on is given and thereafter the surrogate modeling techniques are tested in a pre-defined sequence. The model which first satisfies the tolerance value is selected as the surrogate model for the objective function.

At 320, the method 300 includes optimizing the industrial process using the surrogate model and an optimization model. The optimization may include but not limited to optimization techniques such as genetic algorithm, gradient based methods etc. known in the art. In an embodiment, the formulated surrogate model (from step 318), is passed to the optimization model with constraints on the model parameters to minimize or maximize the second objective function data, and obtain the optimized model parameters. An example scenario of optimization of industrial process, namely Tundish process is described further with reference to FIGS. 4-6.

Example

Figure 4:
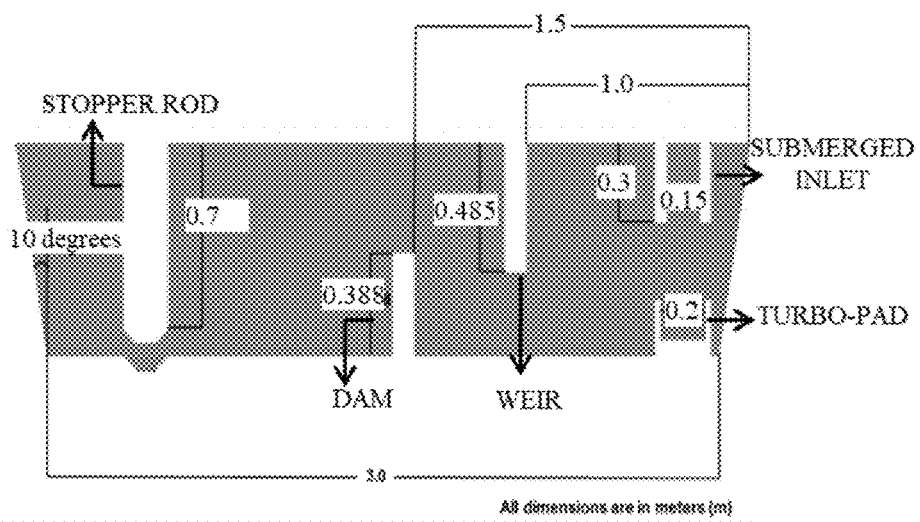
FIGS. 4-6 illustrate results of an example scenario for optimization of industrial processes in accordance with various embodiments of the present disclosure.

First a base geometry of a tundish is selected as shown in FIG. 4. The diameter of the inlet is around 150 mm and the inlet is submerged into the molten steel up to 300 mm depth. The turbo-pad is placed just below the inlet and has an internal diameter of 200 mm. A weir and a dam are located at 1000 mm and 1500 mm from the inlet end having a weir depth of 485 mm and a dam height of 388 mm. A stopper rod is placed just above the outlet to control the outflow of molten steel has a depth of 700 mm. Geometrical parameters namely dam, weir, turbo-pad, stopper rod and submerged inlet are the input parameters to the system for optimization industrial process. Herein, operational parameters such as mass flow rate of molten steel, temperature of steel at the inlet, and so on are not considered. Herein, the objective function for the present example scenario may include the percentage dead volume in the tundish. Based on this objective function, the optimization process may estimate the optimum parameters out of the given input parameters.

Selection of model parameters is done by the user, from the input parameters to obtain the model parameters. In the present example scenario, heights, widths and positions of dam and weir were selected as the model parameters. Data for objective function (i.e. percentage dead volume) is obtained using the CFD runs by varying the model parameters one factor at a time (OFAT), based on which identification of significant model parameters is done using sensitivity analysis. For data creation for objective function, integrated CFD models was used as the numerical model. Based on the model parameters, the geometry and the mesh were created automatically, thereafter by using the developed CFD models for the concerned physics that is, heat transfer and flow, and Residence Time distribution (RTD) of molten steel in tundish. Simulation ready input was created to be given to simulation tool which in this example is OpenFOAM. Simulations were performed to obtain the simulation results for different tundish geometries based on the model parameters. Objective function data (% dead volume) is then obtained by performing post processing on the simulation results.

Figure 5:
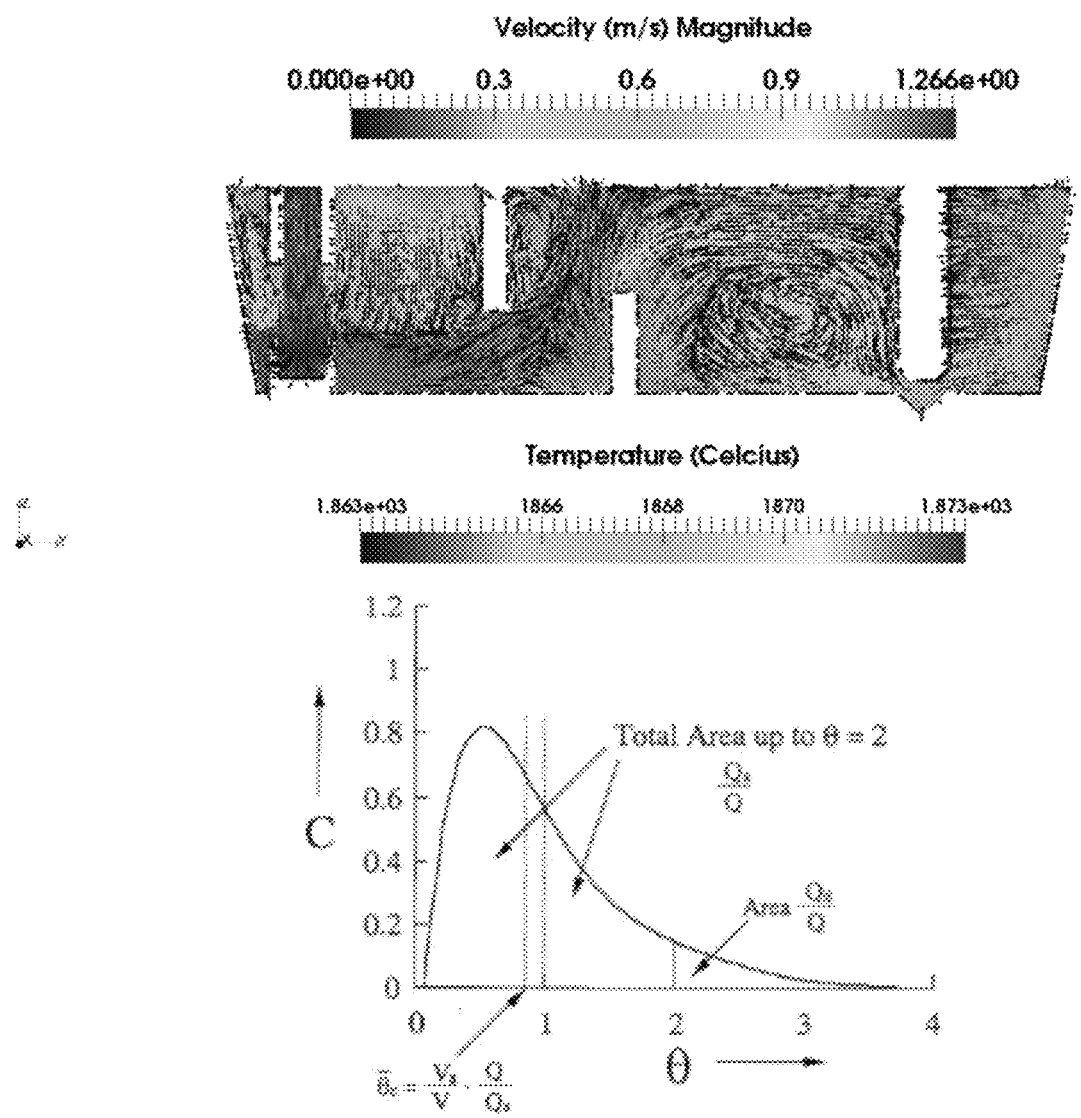

FIG. 5 shows the simulation results and table 1 shows the generated objective function data.

TABLE 1

| case | dp | dt | dh | dw | wt | wh | % deadVol | % mixVol | % plugVol |
|---|---|---|---|---|---|---|---|---|---|
| 1 | 1382.033 | 100 | 360.5167 | 2007.633 | 100 | 452.1833 | 14.35964 | 63.10387 | 22.53648 |
| 2 | 631.7667 | 100 | 166.55 | 1905.633 | 100 | 436.4167 | 16.84066 | 58.18428 | 24.97506 |
| 3 | 992.1667 | 100 | 242.45 | 1997.433 | 100 | 202.1167 | 30.98435 | 49.24732 | 19.76833 |
| 4 | 563.7667 | 100 | 351.7167 | 1950.967 | 100 | 367.1167 | 18.50265 | 55.23389 | 26.26346 |
| 5 | 855.033 | 100 | 222.2833 | 1605.3 | 100 | 141.6167 | 18.7118 | 55.98295 | 25.30526 |
| 6 | 536.5667 | 100 | 385.8167 | 1658.567 | 100 | 563.65 | 25.81807 | 57.03294 | 17.149 |
| 7 | 1134.967 | 100 | 350.25 | 1499.9 | 100 | 537.25 | 31.08364 | 51.2378 | 17.67857 |

Based on this data, identification of significant model parameters was done automatically by using the given input of sensitivity value to obtain the significant parameters. In this case for the sensitivity value of 10%, positions and heights of dam and weir were identified as the significant parameters and it was observed that the percentage dead volume is less sensitive to widths of dam and weir of tundish. These significant parameters were varied from a minimum to maximum range (range for positions of dam and weir is 300 mm to 2400 mm and that of height is 0 to 600 mm), and their different combinations were used for creation of design of experiment (DOE) table using the Latin Hypercube method. Simulations were performed for the experiments of the obtained DOE table and data creation for the objective function was done to get the objective function data (% dead volume) for every tundish design. Using the objective function data, surrogate model creation was done. The disclosed method automatically tested various techniques (linear, two degree, three degree, Support Vector Machine (SVM), Random Forest and K-Nearest Neighbor (KNN)) to formulate surrogate models and the method with best prediction was used as the surrogate model. In the present case KNN model gives the maximum prediction accuracy with value of r-square to be 0.7.

Figure 6:
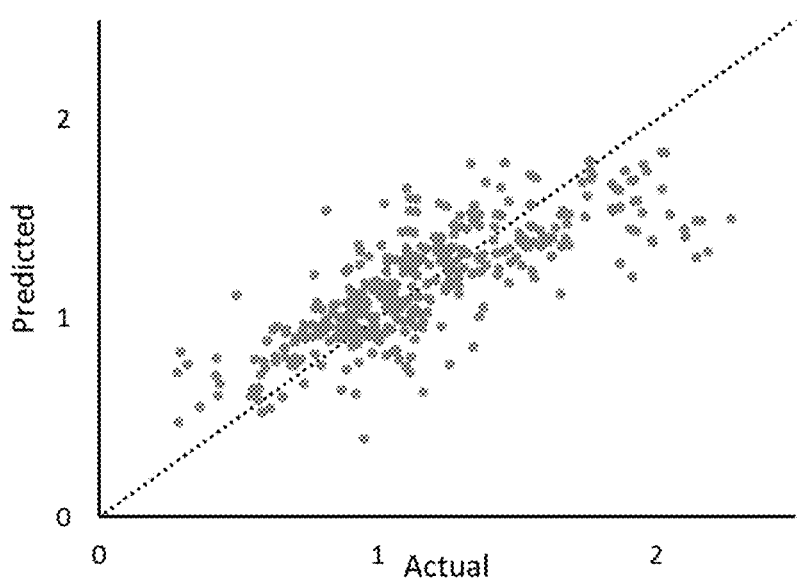

FIG. 6 shows the prediction verses actual values for objective function using the surrogate model. On the formulated surrogate model, optimization was done with the given constraints (range for positions of dam and weir is 300 mm to 2400 mm and that of height is 0 to 600 mm) obtain the optimum parameters for minimum percentage dead volume. The optimization model used herein is dependent on the method of surrogate model itself. This procedure automatically chooses the concerned optimization technique to be used based on the selected surrogate model method. Herein, Particle Swarm Optimization (PSO) model is used as it works well with surrogate models obtained from KNN method. From this procedure, 1033 mm and 1752 mm were obtained as optimal positions and, 326 mm and 390 mm were obtained as the optimal heights of dam and weir respectively for which percentage dead volume was minimum, and was equal to 12.7%, of the total volume of tundish.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

Various embodiments disclosed herein presents methods and system for optimization of industrial processes such as the tundish process. Tundish design is important for producing clean steel. A preferred design of the tundish can be achieved by creating a surrogate model using current operations data and simulation data. In many plants, except for changing the positions of weir, there is no flexibility of changing the design of tundish after it is procured in the plant. Further, operations of plant changes eventually because if supply, demand and other dependent parameters. To get the best quality of steel, the disclosed method proposes to obtain optimal operation parameters automatically and on operator's choice.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor-implemented method comprising:
receiving a plurality of model parameters associated with an industrial process, via one or more hardware processors, the plurality of model parameters comprising a plurality of geometrical parameters and a plurality of operational parameters of an equipment and an optimization function associated with an optimization of the industrial process;
generating, via the one or more hardware processors, a first objective function data for an objective function associated with the optimization task by using one or more model parameters from amongst the plurality of model parameters, wherein generating the first objective function data comprises:
iteratively and selectively varying the plurality of model parameters to obtain a data set of the model parameters,
checking the plurality of geometrical parameters associated with the data set based on a set of rules to identify a set of geometrical parameters capable of facilitating creation of valid geometries for a numerical analysis model, wherein a rule from the set of rules comprises either a rule associated with non-intersecting lines and surfaces associated with geometry of the equipment or a rule associated with formation of closed geometry of the equipment, and
performing simulations using at least the set of geometrical parameters as model parameters on the numerical analysis model to generate the first objective function data;
identifying, via the one or more hardware processors, a set of significant variables from amongst the plurality of model parameters by analyzing relative variation in the first objective function data with respect to model parameters;
creating, via the one or more hardware processors, a Design of Experiments (DOE) table comprising model parameters and variations of model parameters based on the set of significant variables by using a DOE table creation model;
generating, via the one or more hardware processors, a second objective function data using the DOE table;
creating, via the one or more hardware processors, a surrogate model capable of predicting objective function data corresponding to the set of significant variables using the second objective function data and a surrogate modelling technique; and
optimizing, via the one or more hardware processors, the industrial process using the surrogate model and an optimization model.

2. The method of claim 1, wherein the DOE table is created by using one of a Latin Hypercube model, Full Factorial model, and Taguchi model.

3. The method of claim 1, wherein the surrogate modelling technique comprises one of a linear model, polynomial model, K-Nearest Neighbor (kNN) model, and a Random Forest model.

4. The method of claim 1, wherein the optimization model comprises one of a genetic algorithm (GA) and gradient based method.

5. The method of claim 1, wherein the numerical analysis model comprises a computational fluid dynamics model.

6. A system (100) comprising:
one or more memories (106); and
one or more hardware processors (102), the one or more memories (106) coupled to the one or more hardware processors (102), wherein the one or more hardware processors (102) are configured to execute programmed instructions stored in the one or more memories (106), to:
receive a plurality of model parameters associated with an industrial process, the plurality of model parameters comprising a plurality of geometrical parameters and a plurality of operational parameters of an equipment and an optimization function associated with an optimization of the industrial process;
generate a first objective function data for an objective function associated with the optimization task by using one or more model parameters from amongst the plurality of model parameters, wherein generating the first objective function data comprises:
iteratively and selectively vary the plurality of model parameters to obtain a data set of the model parameters,
check the plurality of geometrical parameters associated with the data set based on a set of rules to identify a set of geometrical parameters capable of facilitating creation of valid geometries for the numerical analysis model, wherein a rule from the set of rules comprises either a rule associated with non-intersecting lines and surfaces associated with geometry of the equipment or a rule associated with formation of closed geometry of the equipment, and
perform simulations using at least the set of geometrical parameters as model parameters on the numerical analysis model to generate the first objective function data;
identify a set of significant variables from amongst the plurality of model parameters by analyzing relative variation in the first objective function data with respect to model parameters;
create a Design of Experiments (DOE) table comprising model parameters and variations of model parameters based on the set of significant variables by using a DOE table creation model;
generate, via the one or more hardware processors, a second objective function data using the DOE table;
create a surrogate model capable of predicting objective function data corresponding to the set of significant variables using the second objective function data and a surrogate modelling technique; and
optimize the industrial process using the surrogate model and an optimization model.

7. The system of claim 6, wherein the DOE table is created by using one of a Latin Hypercube model, Full Factorial model, and Taguchi model.

8. The system of claim 6, wherein the surrogate modelling technique comprises one of a linear model, polynomial model, K-Nearest Neighbor (kNN) model, and a Random Forest model.

9. The system of claim 6, wherein the optimization model comprises one of a genetic algorithm (GA) and gradient based method.

10. The system of claim 6, wherein the numerical analysis model comprises a computational fluid dynamics model.

11. One or more non-transitory machine readable information storage mediums comprising one or more instructions which when executed by one or more hardware processors cause:
receiving a plurality of model parameters associated with an industrial process, via one or more hardware processors, the plurality of model parameters comprising a plurality of geometrical parameters and a plurality of operational parameters of an equipment and an optimization function associated with an optimization of the industrial process;

generating, via the one or more hardware processors, a first objective function data for an objective function associated with the optimization task by using one or more model parameters from amongst the plurality of model parameters, wherein generating the first objective function data comprises:

iteratively and selectively varying the plurality of model parameters to obtain a data set of the model parameters, checking the plurality of geometrical parameters associated with the data set based on a set of rules to identify a set of geometrical parameters capable of facilitating creation of valid geometries for a numerical analysis model, wherein a rule from the set of rules comprises either a rule associated with non-intersecting lines and surfaces associated with geometry of the equipment or a rule associated with formation of closed geometry of the equipment, and performing simulations using at least the set of geometrical parameters as model parameters on the numerical analysis model to generate the first objective function data;

identifying, via the one or more hardware processors, a set of significant variables from amongst the plurality of model parameters by analyzing relative variation in the first objective function data with respect to model parameters;

creating, via the one or more hardware processors, a Design of Experiments (DOE) table comprising model parameters and variations of model parameters based on the set of significant variables by using a DOE table creation model;

generating, via the one or more hardware processors, a second objective function data using the DOE table;

creating, via the one or more hardware processors, a surrogate model capable of predicting objective function data corresponding to the set of significant variables using the second objective function data and a surrogate modelling technique; and optimizing, via the one or more hardware processors, the industrial process using the surrogate model and an optimization model.

* * * * *